United States Patent
Zhang

(10) Patent No.: US 9,531,251 B2
(45) Date of Patent: Dec. 27, 2016

(54) QUICK DISCHARGE CIRCUIT

(75) Inventor: Zhong Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 212 days.

(21) Appl. No.: 14/400,345

(22) PCT Filed: May 7, 2012

(86) PCT No.: PCT/CN2012/075112
§ 371 (c)(1),
(2), (4) Date: Nov. 11, 2014

(87) PCT Pub. No.: WO2013/123724
PCT Pub. Date: Aug. 29, 2013

(65) Prior Publication Data
US 2015/0115901 A1  Apr. 30, 2015

(30) Foreign Application Priority Data
Feb. 24, 2012 (CN) .......................... 2012 1 0043383

(51) Int. Cl.
*H02J 7/00* (2006.01)
*H02M 1/32* (2007.01)

(52) U.S. Cl.
CPC ......... *H02M 1/32* (2013.01); *H02M 2001/322* (2013.01)

(58) Field of Classification Search
CPC .............. H01M 10/44; H02J 2007/0067; H02J 2007/004
(Continued)

(56) References Cited

U.S. PATENT DOCUMENTS

| 4,621,313 A * | 11/1986 | Kiteley | H02H 9/001 323/901 |
| 2011/0069059 A1* | 3/2011 | Lee | G05F 1/56 345/212 |

FOREIGN PATENT DOCUMENTS

| CN | 2257630 Y | 7/1997 |
| CN | 101252309 A | 8/2008 |

(Continued)

OTHER PUBLICATIONS

International Search Report for PCT/CN2012/075112 dated Nov. 13, 2012.

*Primary Examiner* — Paul Dinh
(74) *Attorney, Agent, or Firm* — Ling Wu; Stephen Yang; Ling and Yang Intellectual Property

(57) ABSTRACT

A quick discharge circuit includes a reference voltage source, a power supply voltage monitoring circuit, a control circuit, and a discharge circuit. The reference voltage source provides a threshold voltage for quick discharge; the power supply voltage monitoring circuit collects change conditions of a power supply voltage; the control circuit performs logical control according to the power supply voltage collected by the power supply voltage monitoring circuit and the threshold voltage provided by the reference voltage source to determine whether the discharge circuit is ON. With the quick discharge circuit, when a terminal product is powered off, an input bulk capacitor of a DC-DC circuit is discharged quickly so that the voltage thereof rapidly drops to a safe voltage range. When the terminal product is powered on again quickly, it is guaranteed that a soft start circuit works normally so as to implement slow increase of power-on voltage and current.

6 Claims, 1 Drawing Sheet

(58) Field of Classification Search
USPC .......................................... 320/127, 134–136
See application file for complete search history.

(56) References Cited

FOREIGN PATENT DOCUMENTS

CN         101800467 A     8/2010
JP        2007-244156 A     9/2007

* cited by examiner

QUICK DISCHARGE CIRCUIT

TECHNICAL FIELD

The present document relates to the field of power supply technologies, and in particular, to a quick discharge circuit with a bulk capacitor applied in the power supply.

BACKGROUND OF THE RELATED ART

When a terminal product is inserted into a power supply port, an instant power-on inrush current will be generated at the power supply port as a filter capacitor of an input end of the power supply of the terminal product needs to draw a large amount of instant current to establish a voltage, which causes the voltage at the power supply port to drop instantly, thereby influencing the stability of the power supply system.

In order to maintain the stability of the power supply system, a soft start circuit will generally be added at the input side of the power supply of the terminal product in the related technologies, to reduce the impact on the power supply due to the power-on of the terminal. The soft start circuit is generally followed by a DCDC circuit. In order to deal with a large spike-type load current, the input end of the DCDC circuit will generally have an energy-storage capacitor with a large capacity.

In the related technologies, there are mainly the following problems: when the terminal product is plugged quickly, the discharge of the input capacitor with a large capacity of the DCDC will be very slow, which results in the voltage of the back end of the soft start circuit dropping slowly, and when the terminal product is powered on again quickly, a Metal-Oxide-Semiconductor Field Effect Transistor (MOSFET) transistor of the soft start circuit may be still in a direct on-state, which causes the soft start circuit to be ineffective. If the soft start circuit is not in use, the power-on inrush voltage and the inrush current will impact the device of the back end of the soft start circuit directly, which results in a damage of the device.

SUMMARY OF THE INVENTION

The purpose of the embodiments of the present document is to provide a quick discharge circuit. When a terminal product is powered off, an input bulk capacitor of a DCDC is discharged quickly so that the voltage thereof rapidly drops to a safe voltage range of a few hundred millivolts. When the terminal product is powered on again quickly, it is guaranteed that a soft start circuit works normally so as to implement the slow increase of power-on voltage and current.

In order to solve the above technical problem, the present document provides a quick discharge circuit, comprising a reference voltage source, a power supply voltage monitoring circuit, a control circuit, and a discharge circuit;

the reference voltage source provide a threshold voltage for quick discharge;

the power supply voltage monitoring circuit collect change conditions of a power supply voltage; and the control circuit perform logical control according to the power supply voltage collected by the power supply voltage monitoring circuit and the threshold voltage provided by the reference voltage source to determine whether the discharge circuit is ON or not.

The reference voltage source comprises a first resistor and a voltage-regulator tube, one end of the first resistor is connected to a positive pole of a power supply input after a soft start circuit, and the other end of the first resistor is connected to the voltage-regulator tube; and the other end of the voltage-regulator tube is connected to GND.

The power supply voltage monitoring circuit comprises a second resistor and a third resistor, the second resistor and the third resistor are connected between the positive pole of the power supply input and the GND.

The control circuit comprises a voltage comparator, a triode and a fourth resistor, a base of the triode is connected to an output end of the voltage comparator, an emitter of the triode is connected to the GND; and one end of the fourth resistor is connected to a positive pole of the power supply input, and the other end of the fourth resistor is connected to a collector of the triode;

an non-inverting input end of the voltage comparator is connected between the first resistor and the voltage-regulator tube, an inverting input end of the voltage comparator is connected at a voltage division point between the second resistor and the third resistor, the positive pole of the voltage comparator is connected between the first resistor and the voltage-regulator tube, and the negative pole of the voltage comparator is connected to the GND; and the voltage comparator determine whether an output of the output end of the voltage comparator is at a high level or a low level by comparing a voltage of the positive pole of the power supply input collected by the inverting input end and the reference voltage provided by the reference voltage source.

The discharge circuit comprises a field-effect transistor, a gate of the field-effect transistor is connected to the collector of the triode, a source of the field-effect transistor is connected to the positive pole of the power supply input, and a drain of the field-effect transistor is connected to the GND.

When the output of the output end of the voltage comparator is at a low level, the triode cuts off, there is no voltage difference formed between the gate and the source of the field-effect transistor, and the field-effect transistor cuts off; and When the output of the output end of the voltage comparator is at a high level, the triode is ON, there is a voltage difference formed between the gate and the source of the field-effect transistor, and when the voltage difference achieves an On-voltage of the field-effect transistor, the field-effect transistor is ON.

The field-effect transistor is a P channel MOSFET transistor.

In conclusion, with the quick discharge circuit according to the embodiments of the present document, when a terminal product is powered off, an input bulk capacitor of a DCDC is discharged quickly so that the voltage thereof rapidly drops to a safe voltage range of a few hundred millivolts. When the terminal product is powered on again quickly, it is guaranteed that a soft start circuit works normally so as to implement the slow increase of power-on voltage and current. This solves the problem in the related technologies that the input capacitor with a large capacity of the DCDC can not discharge quickly which results in the soft start circuit being not in use.

BRIEF DESCRIPTION OF DRAWINGS

The accompanying drawings described herein are used to provide a better understanding of the embodiments of the present document and constitute a part of this application, and the schematic embodiments of the present document and the descriptions thereof are used to explain the present document and do not constitute an improper definition of the present document. In the accompanying drawings.

PREFERRED EMBODIMENTS OF THE INVENTION

The embodiments of the present document will be described in detail below in conjunction with accompanying drawing hereinafter. It should be illustrated that, in the case of no conflict, the embodiments in this application and the features in the embodiments could be combined randomly with each other.

Figure 1:
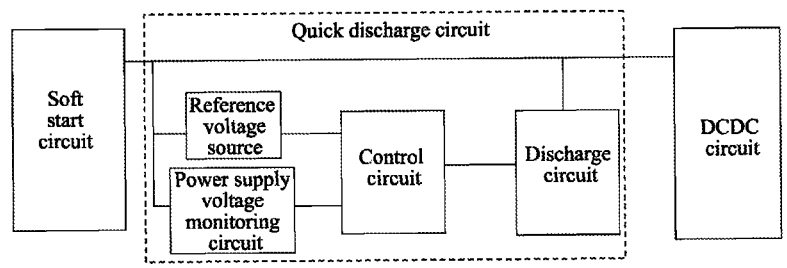
FIG. 1 is a schematic block diagram of a quick discharge circuit according to an embodiment of the present document.

As shown in FIG. 1, a quick discharge circuit according to an embodiment of the present document is used to discharge an input bulk capacitor of the DCDC quickly. The quick discharge circuit is primarily comprised of a reference voltage source, a power supply voltage monitoring circuit, a control circuit, and a discharge circuit. the reference voltage source provides a threshold voltage for quick discharge; the power supply voltage monitoring circuit collects change conditions of a power supply voltage; and the control circuit performs logical control according to the power supply voltage collected by the power supply voltage monitoring circuit and the threshold voltage provided by the reference voltage source to determine whether the discharge circuit is ON or not.

The above control circuit performing logical control according to the power supply voltage collected by the power supply voltage monitoring circuit and the threshold voltage provided by the reference voltage source to determine whether the discharge circuit is ON or not, specifically comprises when the voltage output by the power supply voltage monitoring circuit is higher than the voltage output by the reference voltage source, the control circuit controlling the discharge circuit to be in a cut-off state; and when the voltage output by the power supply voltage monitoring circuit is lower than the voltage output by the reference voltage source, the control circuit controlling the discharge circuit to be in an on-state, so as to enable the discharge circuit to discharge quickly.

Figure 2:
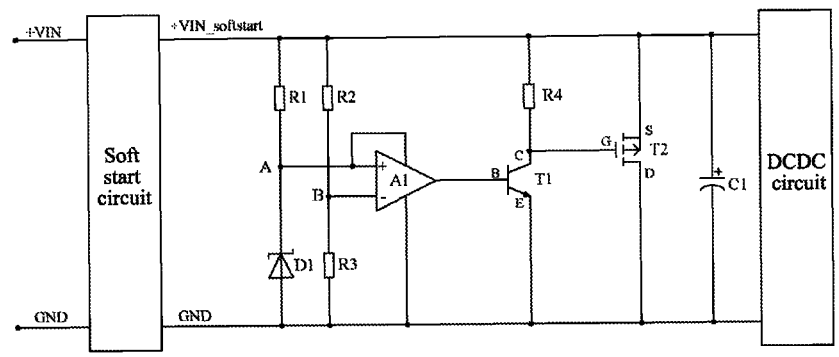
FIG. 2 is a structural diagram of a quick discharge circuit according to an embodiment of the present document.

With reference to FIG. 2, a quick discharge circuit according to an embodiment of the present document is connected to both ends of a positive power supply after a soft start circuit, which are a positive pole (+VIN_softstart) of a power supply input and a negative pole (GND) of the power supply input.

As shown in FIG. 2, the quick discharge circuit according to the present embodiment specifically comprises:

a reference voltage source, comprising a first resistor (R1) and a voltage-regulator tube (D1), one end of the first resistor (R1) is connected to a positive pole (+VIN_softstart) of the power supply input; and one end of voltage-regulator tube (D1) is connected to the other end of the first resistor (R1), and the other end of the voltage-regulator tube (D1) is connected to GND. The first resistor (R1) and the voltage-regulator tube (D1) constitute a reference voltage, and with a good voltage-regulating characteristic of the voltage-regulator tube (D1), a stable reference voltage is provided to a voltage comparator (A1);

a power supply voltage monitoring circuit, comprising a second resistor (R2) and a third resistor (R3), wherein one end of the second resistor (R2) is connected to a positive pole (+VIN_softstart) of the power supply input; and one end of the third resistor (R3) is connected to the other end of the second resistor (R2), and the other end of the third resister (R3) is connected to GND. The resister (R2) and the resister (R3) play a voltage division role of the positive pole (+VIN_softstart) of the power supply input, and transmit the divided voltages to the inverting input end of the voltage comparator (A1) to monitor the voltage changes of the positive pole (+VIN_softstart) of the power supply input.

a control circuit, comprising the voltage comparator (A1), a triode (T1) and a fourth resistor (R4), a non-inverting input end (UIN+) of the voltage comparator (A1) is connected between the first resistor (R1) and the voltage-regulator tube (D1), and the inverting input end (UIN−) of the voltage comparator (A1) is connected between the second resistor (R2) and the third resistor (R3), the voltage comparator (A1) is powered with an unipolar power supply, a positive pole of the power supply is connected between the first resistor (R1) and the voltage-regulator tube (D1), and a negative pole of the power supply is connected to GND; one end of the fourth resistor (R4) is connected to the positive pole (+VIN_softstart) of the power supply input; and the triode (T1) is an NPN type triode, of which a base B is connected to an output end (UOUT) of the voltage comparator (A1), an emitter E is connected to GND, and a collector C is connected to the other end of the fourth resistor (R4). The voltage comparator (A1) determines whether an output of the output end (UOUT) of the voltage comparator (A1) is at a high level or a low level by comparing a voltage of the positive pole (+VIN_softstart) of the power supply input collected by the inverting input end and the reference voltage of the non-inverting input end.

a discharge circuit, comprising a field-effect transistor (T2), the field-effect transistor (T2) is a P channel MOSFET transistor, of which a gate G is connected to the collector C of the triode (T1), a source S is connected to the positive pole (+VIN_softstart) of the power supply input, and a drain D is connected to GND; and a capacitor (C1), which is a quick discharge object, and the input end of the DCDC has a bulk energy-storage capacitor.

When the output of the output end (UOUT) of the voltage comparator (A1) is at a low level, the triode (T1) cuts off, there is no voltage difference between the gate G and the source S of the MOSFET transistor (T2), and the MOSFET transistor (T2) cuts off. When the output of the output end (UOUT) of the voltage comparator (A1) is at a high level, the triode (T1) is ON, there is a voltage difference formed between the gate G and the source S of the MOSFET transistor (T2), which is represented by Vgs, and when the Vgs achieves the On-voltage threshold of the MOS transistor, the MOSFET transistor (T2) is ON. An on-resistance of the MOSFET transistor is small, which can implement quick discharge of the bulk capacitor (C1).

When the terminal product works normally, a voltage of point B is higher than a voltage of point A, and the voltage comparator A1 outputs at a low level, and at this time, both the triode T1 and the MOSFET transistor T2 are in a cut-off state. When the terminal product is powered off, a voltage +VIN_softstart of a back end of the soft start circuit will reduce gradually, and when the voltage of point B starts to be lower than the voltage of point A, the output level of the voltage comparator A1 will change from a low level to a high level, and at this time, a voltage between B-E poles of the triode is higher than an On-voltage, the triode starts to be ON, and at this time, a voltage difference will be formed between the gate G and the source S of the MOSFET transistor T2, which is represented by Vgs. When Vgs achieves the On-voltage threshold of the MOS transistor, the MOSFET transistor T2 is ON. As the on-resistance of the MOSFET transistor is small, the bulk capacitor C1 can be discharged quickly, so that the voltage +VIN_softstar of the back end of the soft start circuit drops to a safe voltage range of a few hundred mV or less on the order of ms. When the terminal product is powered on again, the MOSFET transistor of the soft start circuit has cut off, and said direct On-state problem will not occur again in the soft start circuit, and instead, the soft start circuit normally starts and is powered on.

With the above technical schemes, the embodiments of the present document have the following advantages:

1. Different reference voltages can be set by selecting voltage-regulator tubes D1 with different voltage-regulating voltages, i.e., different thresholds for quick discharge can be set, which can effectively avoid restart of the terminal product due to falsely triggering the quick discharge circuit when the input voltage of the DCDC drops instantly.

2. If in the actual applications, it is not desired to make the threshold for quick discharge too low thereby increasing the time of quick discharge, and it is also not desired to falsely trigger the quick discharge circuit as a result of an instant drop of the input voltage of the DCDC due to an occasional interruption, a voltage comparator with a hysteresis characteristic can be selected.

3. A low on-impedance characteristic of the MOSFET transistor can ensure that the energy stored in the bulk capacitor can be released soon, so that the voltage +VIN_softstar of the back end of the soft start circuit drops to a safe voltage range of hundred mV or less on the order of ms, thereby ensuring that the soft start circuit can always work normally when the terminal is plugged quickly.

The above description is only the preferred embodiments of the present document and is not intended to limit the present document. The present document can have a plurality of other embodiments. Without departing from the spirit and substance of the embodiments of the present document, those skilled in the art can make various corresponding changes and variations according to the embodiments of the present document, and all these corresponding changes and variations should belong to the protection scope of the appended claims in the present document.

INDUSTRIAL APPLICABILITY

Compared with the existing technologies, with the embodiments of the present document, when a terminal product is powered off, an input bulk capacitor of a DCDC is discharged quickly so that the voltage thereof rapidly drops to a safe voltage range of a few hundred millivolts. When the terminal product is powered on again quickly, it is guaranteed that a soft start circuit works normally so as to implement the slow increase of power-on voltage and current. This solves the problem in the related technologies that the input capacitor with a large capacity of the DCDC can not discharge quickly which results in the soft start circuit being not in use.

What is claimed is:

1. A quick discharge circuit, comprising: a reference voltage source, a power supply voltage monitoring circuit, a control circuit, and a discharge circuit; wherein,
the reference voltage source is configured to provide a threshold voltage for quick discharge;
the power supply voltage monitoring circuit is configured to collect change conditions of a power supply voltage; and
the control circuit is configured to perform logical control according to the power supply voltage collected by the power supply voltage monitoring circuit and the threshold voltage provided by the reference voltage source to determine whether the discharge circuit is ON or not;
wherein the control circuit comprises a voltage comparator, a triode and a fourth resistor, a base of the triode is connected to an output end of the voltage comparator, an emitter of the triode is configured to be connected to the GND; and one end of the fourth resistor is configured to be connected to a positive pole of the power supply input, and the other end of the fourth resistor is connected to a collector of the triode;
an non-inverting input end of the voltage comparator is connected between the first resistor and the voltage-regulator tube, an inverting input end of the voltage comparator is connected at a voltage division point between the second resistor and the third resistor, the positive pole of the voltage comparator is connected between the first resistor and the voltage-regulator tube, and the negative pole of the voltage comparator is connected to the GND; and
the voltage comparator is configured to determine whether an output of the output end of the voltage comparator is at a high level or a low level by comparing a voltage of the positive pole of the power supply input collected by the inverting input end and the reference voltage provided by the reference voltage source.

2. The quick discharge circuit according to claim 1, wherein,
the reference voltage source comprises a first resistor and a voltage-regulator tube, one end of the first resistor is configured to be connected to a positive pole of a power supply input after a soft start circuit, and the other end of the first resistor is connected to the voltage-regulator tube; and the other end of the voltage-regulator tube is configured to be connected to a negative pole (GND) of the power supply input.

3. The quick discharge circuit according to claim 2, wherein,
the power supply voltage monitoring circuit comprises a second resistor and a third resistor, the second resistor and the third resistor are configured to be connected between the positive pole of the power supply input and the GND.

4. The quick discharge circuit according to claim 1, wherein,
the discharge circuit comprises a field-effect transistor, a gate of the field-effect transistor is connected to the collector of the triode, a source of the field-effect transistor is configured to be connected to the positive pole of the power supply input, and a drain of the field-effect transistor is configured to be connected to the GND.

5. The quick discharge circuit according to claim 4, wherein,
when the output of the output end of the voltage comparator is at a low level, the triode cuts off, there is no voltage difference formed between the gate and the source of the field-effect transistor, and the field-effect transistor cuts off; and
when the output of the output end of the voltage comparator is at a high level, the triode is ON, there is a voltage difference formed between the gate and the source of the field-effect transistor, and when the voltage difference achieves an ON-voltage of the field-effect transistor, the field-effect transistor is ON.

6. The quick discharge circuit according to claim 4, wherein,
the field-effect transistor is a P channel Metal-Oxide-Semiconductor Field Effect Transistor (MOSFET).

\* \* \* \* \*